United States Patent

Mistler

(10) Patent No.: US 6,676,220 B2
(45) Date of Patent: Jan. 13, 2004

(54) DUMP RACK

(76) Inventor: Michael F. Mistler, 700 Hybernia, Jefferson City, MO (US) 65109

( * ) Notice: Subject to any disclaimer, the term of this patent is extended or adjusted under 35 U.S.C. 154(b) by 378 days.

(21) Appl. No.: 09/800,180

(22) Filed: Mar. 6, 2001

(65) Prior Publication Data

US 2003/0015906 A1 Jan. 23, 2003

(51) Int. Cl.[7] .................................................. B60P 1/00
(52) U.S. Cl. ..................... 298/1 A; 298/22 R; 298/22 P
(58) Field of Search ............................... 298/1 A, 17 R, 298/22 R, 22 P; 296/3; 224/280, 282; 211/1.51, 170

(56) References Cited

U.S. PATENT DOCUMENTS

| | | | |
|---|---|---|---|
| 1,506,422 A | | 8/1924 | Gibbons |
| 3,826,534 A | * | 7/1974 | Ruff ............................ 298/1 A |
| 3,833,261 A | * | 9/1974 | Dingler ....................... 298/1 A |
| 3,871,706 A | * | 3/1975 | Odom .......................... 298/1 A |
| 3,891,262 A | | 6/1975 | Brunel |
| 4,057,281 A | | 11/1977 | Garrett |
| 4,126,357 A | * | 11/1978 | Day ............................ 298/1 A |
| 4,267,948 A | | 5/1981 | Lewis |
| 4,647,110 A | * | 3/1987 | McKee ........................ 298/1 A |
| 4,659,131 A | | 4/1987 | Flournoy, Jr. |
| 4,681,371 A | * | 7/1987 | Leonard ...................... 298/1 A |
| 4,770,458 A | | 9/1988 | Burke et al. |
| 4,953,757 A | | 9/1990 | Stevens et al. |
| 5,037,152 A | | 8/1991 | Hendricks |
| 5,190,337 A | | 3/1993 | McDaniel |
| 5,267,779 A | * | 12/1993 | Talamantez, Jr. et al. ... 298/1 A |
| 5,431,472 A | | 7/1995 | Coffland |
| 5,447,361 A | * | 9/1995 | Phillips ....................... 298/1 A |
| 5,743,583 A | | 4/1998 | Lowe |
| 5,749,436 A | | 5/1998 | Satchwell, III |
| 5,836,657 A | * | 11/1998 | Tilley et al. ................. 298/1 A |
| 5,868,453 A | | 2/1999 | Steigner |
| 6,059,371 A | * | 5/2000 | Smith et al. ................. 298/1 A |
| 6,196,634 B1 | * | 3/2001 | Jurinek ........................ 298/1 A |
| 6,371,564 B1 | * | 4/2002 | Yates et al. .................. 298/1 A |

FOREIGN PATENT DOCUMENTS

| | | | | |
|---|---|---|---|---|
| DE | 3914-314 A | * | 10/1990 | ................. 224/282 |

* cited by examiner

Primary Examiner—Stephen T. Gordon
(74) Attorney, Agent, or Firm—Richard Grundstrom

(57) ABSTRACT

A dump rack for attachment to pickups and other vehicles that is used to haul materials, tools or supplies. The dump rack of this invention has a stationary frame that attaches on the sidewalls of a pickup box or other vehicle. The stationary frame has side members attachable to the top edge of the pickup bed sidewalls and a cross member that fits at and within the front of the bed. A pivoting frame is pivotally attached to the stationary frame. A front end of a dump rack is pivotally attached to the pivoting frame. The rear of the dump frame has rear pivot legs which are pivotally attached to the dump frame and to a rear end of the side members on the stationary frame. A lift mechanism operates on the pivoting frame to pivot the pivoting frame between a lower position and an upper position. As the lift mechanism lifts the front of the pivoting frame, the front of the dump rack is raised and the rear of the dump rack is pivoted rearward and downward. As the dump frame pivots the load carried thereon is dumped.

19 Claims, 6 Drawing Sheets

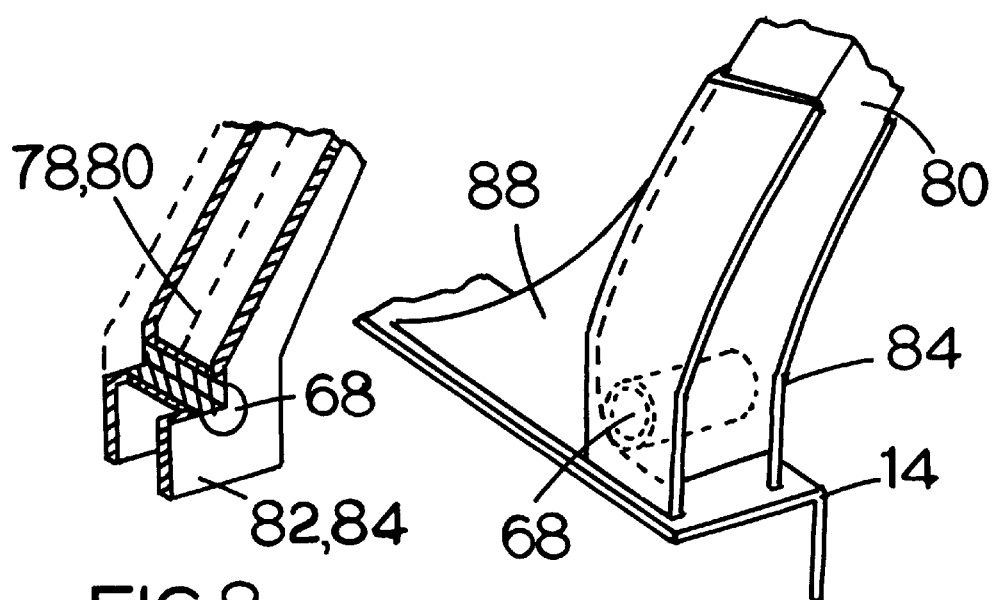
FIG. 8
FIG. 7
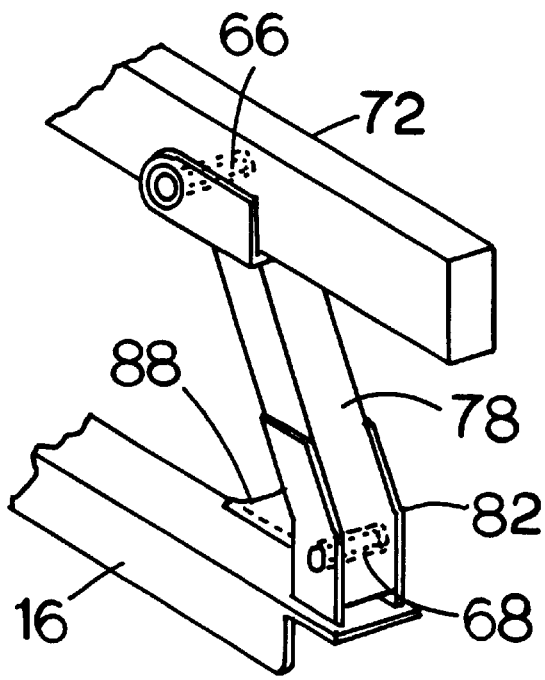
FIG. 6

DUMP RACK

BACKGROUND OF THE INVENTION

The present invention relates to a rack for mounting on a truck, trailer or the like and more particularly to a dump rack mountable on a truck and other type of vehicles.

Contractors, suppliers, and others have trucks and trailers for transporting various types of supplied, equipment, tools, and many other items or articles. Many of the truck and trailers have racks for transporting long items, such as ladders, brakes, tripods, pipes of all kinds and sizes, lumber, rebar, steel, siding, and other long items which typically do not fit in the bed of the truck or trailer.

Most racks have stationary frames attached to the side rails of the bed of the truck or trailer. Typically, there is a forward upright frame member and a rear upright frame member both with cross members. Typically, the frame forms legs extending downward from the ends of the cross member for attachment to the siderails. Longitudinal members extend between the forward and rear members to make a complete frame or rack. Other support members, additional legs, cross members, and attaching devices are incorporated on the frame based upon the particular application. As such, there is a wide variety and many configurations known and used. Many are factory made and many are custom made as needed.

The fixed and stationary racks are generally loaded by lifting the item or article to be transported to the height of the top of the rack and then placed on the rack. The item or article is then secured by ropes, chains, bungee cords, or by other known securing means. Some items can be placed by lifting one end and placing the end on an edge of the rack. The opposite end is then lifted and the item is slid in place on the rack. Either way the items are lifted in one way or another.

The items or article are unloaded from the rack from one side or the other, or are pulled off the rear end of the rack. The items are either lifted from the rack and removed, or one end is slightly lifted and the item is pulled off the rack. Once the end is close to sliding off, the pulled end is lowered to the ground and the end on the rack is lifted off and set down.

It is often difficult for one person to load or unload a rack, especially if the items are heavy, long or bulky. Often two or more persons are used. Loading and unloading requires lifting weight from a low position to a high position or from a high position to a low position. Both loading and unloading is strenuous work which can result in injury. Plus, items are often dropped when being loaded and unloaded. This can and does result in personal injury to the person performing the work, and property damage. Additionally, it can be time consuming to load and unload the rack, especially when articles are heavy or cumbersome and two or more persons are required. This results in expending expensive man-hours and possibilities of personal injury.

The dump rack of this invention overcome several of the problems associated with fixed and stationary racks. The rack pivots to dump it's load. The rack of this invention requires a minimum amount of work and requires basically little if any physical exertion to unload the items on the rack. The rack of this invention also eliminate hazards when unloading. Since the rack pivots to dump its load, there is no strenuous activities for the person unloading the rack. Since the user is operating the rack from a remote location, there is no danger of the items falling or hitting the person.

Accordingly, it is an object of the present invention to provide a dump rack that is adapted to fit most if not all pickup trucks, and other types of vehicles and adapted for use to safely haul materials of different nature which are generally to long to fit within the vehicle itself.

Another object of the present invention is to provide a dump rack that is constructed to pivot between a lower position and an upper position for use in dumping or unloading the load being carried by the dump rack.

A further object of the present invention is to provide a dump rack that is adapted for dumping its load by raising the front and lowering the rear. In the arrangement of this invention, the dump rack raises in the front and lowers in the rear to thereby provide rear clearance of the vehicle with a substantial lift height at the forward end to allow the load to easily slide off the rear of the dump rack and clear the vehicle.

Still another object of the present invention is to provide a dump rack that can eliminate hazards to the worker, eliminate hazards to the vehicle and other property near by, and eliminate time needed for unloading materials from the rack. The use of this invention the worker does not have to manually unload the rack to thereby eliminate the hazards to him and to eliminate the amount of time.

Still a further object of the present invention is to provide a dump rack in which the load can be unloaded in a very rapid manner yet in a very controlled situation. With this invention, the load can be easily unloaded at a fast rate or at a slow rate as determined by the rate and height of lift.

To accomplish the foregoing and other objects of this invention there is provided a dump rack and more particularly to dump rack for attachment to pickups and other vehicle in which the rack pivots to dump its load.

SUMMARY OF THE INVENTION

The dump rack of this invention is basically a rack for attachment to pickups, or other vehicles, that is used to haul materials, tools or supplies. Typically racks of the past are fixed and can not dump and are usually used to carry ladders, lumber, pipes, or other items to long to fit within the bed. The dump rack of this invention is used as a regular pickup rack, but has the extra provisions to dump the load.

There is a stationary frame that attaches on the pickup box. The frame has side members attachable to the top edge of the pickup bed and a cross member that fits at and within the front of the bed. A pivot frame is pivotally attached to a forward location on the stationary frame. At the rear of the stationary frame there are rear pivot legs pivotally attached by a support bracket. A front portion of a dump frame is pivotally attached to the pivot frame attached and a rear portion of the dump frame is pivotally attached to the rear pivot legs. A lifting mechanism, generally and in the preferred embodiment a pair of hydraulic cylinders, pivots the pivot frame between a lower position and an upper position. As the lifting mechanism pivots the pivot frame, the dump frame is pivoted with the front end being raised. As the front end is raised, the rear end of the dump frame is pivoted rearward and downward to provide clearance and a lowered dump height for the load. As it lifts or pivots, the load is dumped off the rear.

The above mentioned and other objects, and features of the present invention will be better understood and appreciated from the following detailed description of the main embodiment thereof, selected for purposes of illustration and shown in the accompanying drawings.

BRIEF DESCRIPTION OF THE DRAWINGS

FIG. 3A shows an end view of typical stationary frame and further showing additional support members under the box of the truck.

FIG. 6 is an larger view of the rear pivot pin support bracket showing the pivot pin, the rear pivot leg, and the dump frame attached to the rear pivoting leg with a pivot pin.

FIG. 7 is a more detailed view of the rear pivot pin support and rear pivoting leg.

FIG. 8 is a sectional view of a typical pivot pin installation in a pivot pin support bracket.

DETAILED DESCRIPTION

Figure 1:
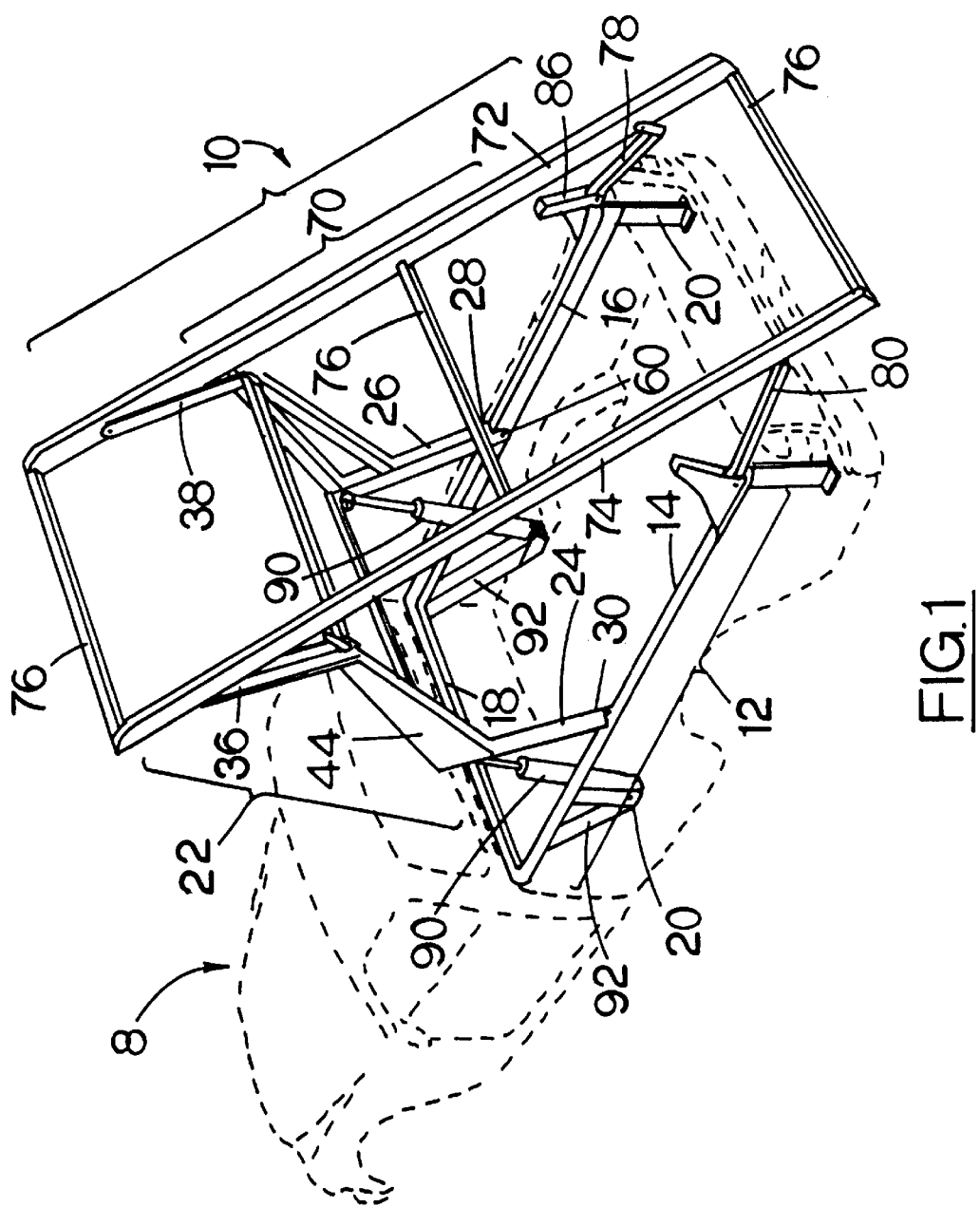
FIG. 1 shows an isometric view of the preferred embodiment of a dump rack in accordance with this invention, with the rack being in an upper position on a phantom truck.
Figure 2:
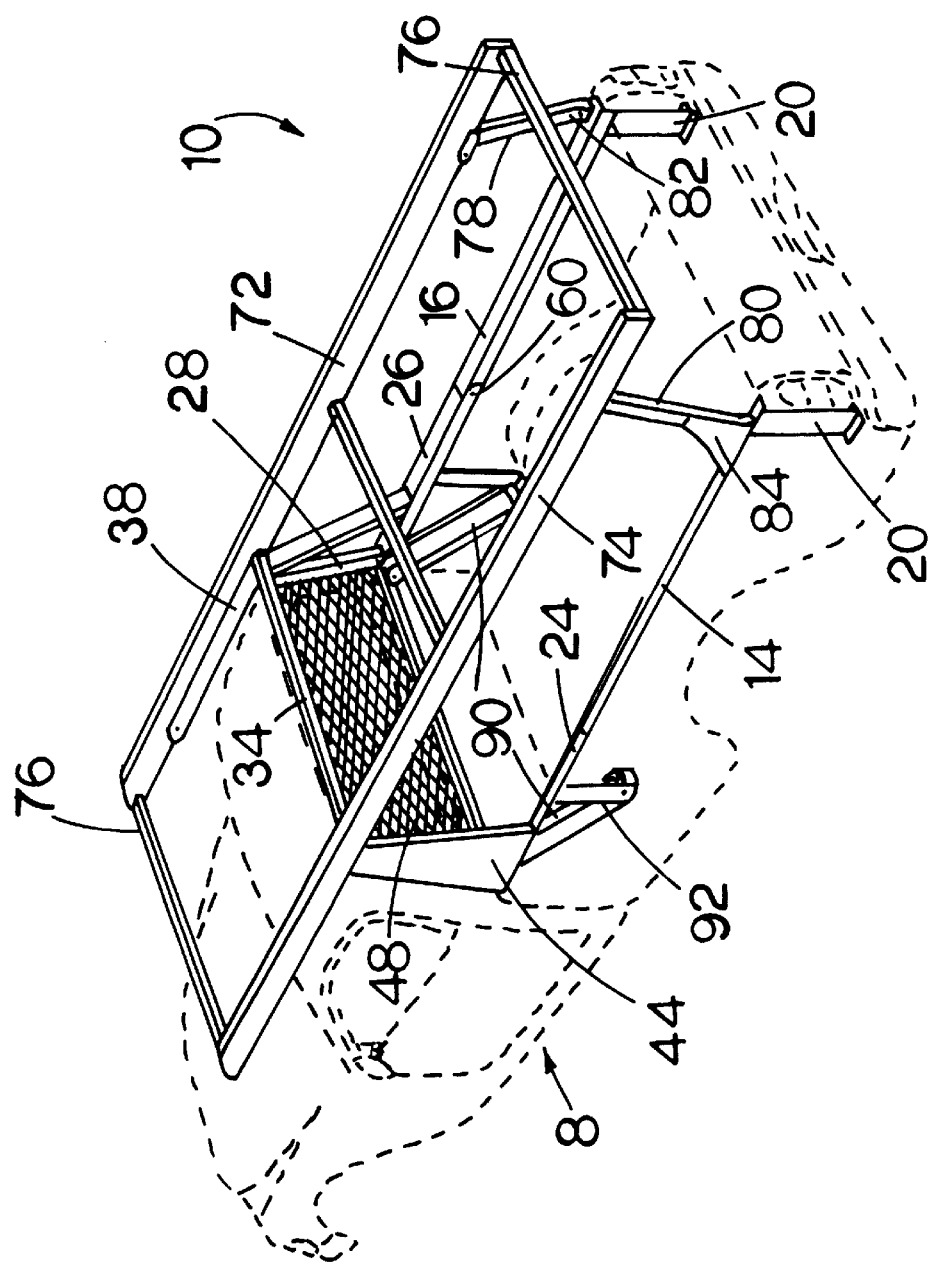
FIG. 2 shows an isometric view of the preferred embodiment of a dump rack in accordance with this invention, with the rack being in a lower position on a phantom truck.

Referring now to the drawings in general there is shown the preferred embodiment, and best mode contemplated, of the dump rack 10 of this invention. The preferred embodiment and the best mode contemplated of the dump rack 10 of the present invention is herein described. However, it should be understood that the best mode for carrying out the invention hereinafter described is offered by way of illustration and not by the way of limitation. It is intended that the scope of the invention include all modifications which incorporate its principal design features.

Figure 3:
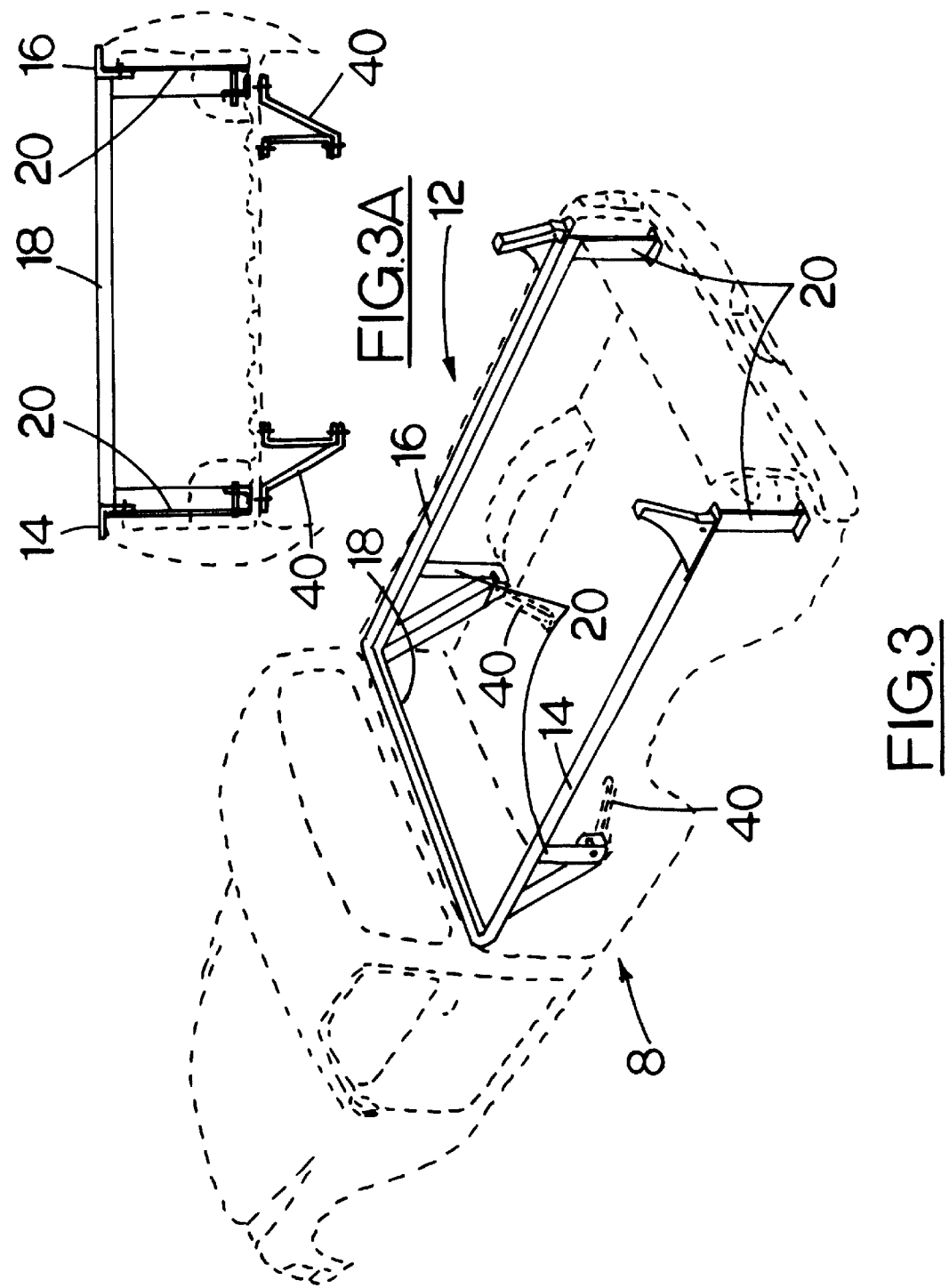
FIG. 3 shows a typical stationary frame for the preferred embodiment of the dump rack with rear pivot point support brackets.

The first portion of the dump rack is a stationary frame 12 that attaches to a vehicle. Typically, the stationary frame 12 is attached to the bed of a pickup truck 8, as shown and illustrated in FIG. 3 for demonstration purposes, but it could also be attached to a trailer or other type of vehicle. The stationary frame 12, in the preferred embodiment, has a pair of side members 14 and 16, and a forward cross member 18 attached to forward ends of the side members 14 and 16. The stationary frame 12 is typically sized to fit the box of the truck 8 or other vehicle. Other configurations of the stationary frame 12 could also perform the function of the stationary frame 12 as described in detail herein. Any stationary frame resulting in the same or equivalent function is considered within the scope of this invention.

In the preferred embodiment, and as the best mode contemplated, the side members 14 and 16 and forward cross member 18 are made from steel angle iron sized, cut, and welded as required to fit the vehicle. One leg of the angle iron will set upon the sidewall and the other leg will extend downward on the inside edge of the sidewall of the truck box. This arrangement provides stability in that the frame 12 fits into the box of the truck and will not slip or slide sideways or forward. The downward extending leg of the angle iron secures the frame in place.

Typically, support legs 20 would extend downward from the side members 14 and 16 to a floor or bed of the vehicle in most instances, as required. The side members 14 and 16 and the support legs 20 stabilize and secures the stationary frame 12 to the vehicle and transfers weight of the dump rack 10 and its load, to the bed rather than onto the sidewalls. The side members 14 and 16 and/or legs 20 are generally bolted, welded, or clamped to the vehicle to secure the stationary frame 12 to the vehicle 8.

In some applications, FIG. 3A, additional support members 40 may be provided at the bottom of, or under, the pickup box, bed, or other application or vehicle type, to the vehicle frame. These additional support members 40 are typically metal brackets that provide extra strength and stability, as needed, and for extra capacity. These can be standardized to fit common applications or custom made as needed. In some instances they may not be required. They help to distribute the weight to the frame as needed.

Figure 4:
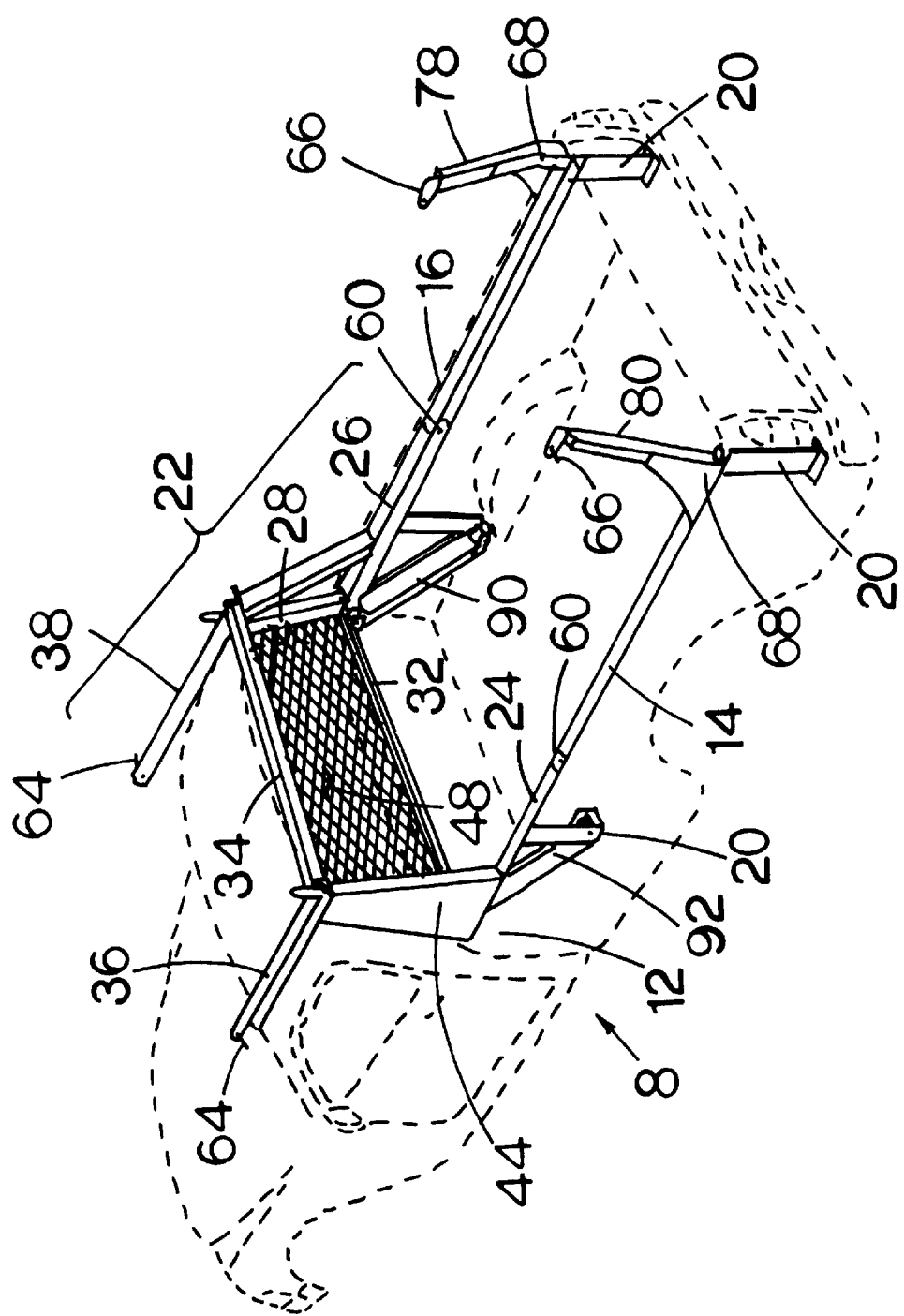
FIG. 4 shows a pivoting frame for the preferred embodiment of the dump rack in a lower position attached to the stationary frame shown in FIG. 3 and rear pivoting legs which are pivotally attached to rear pivot pin support brackets.
Figure 5:
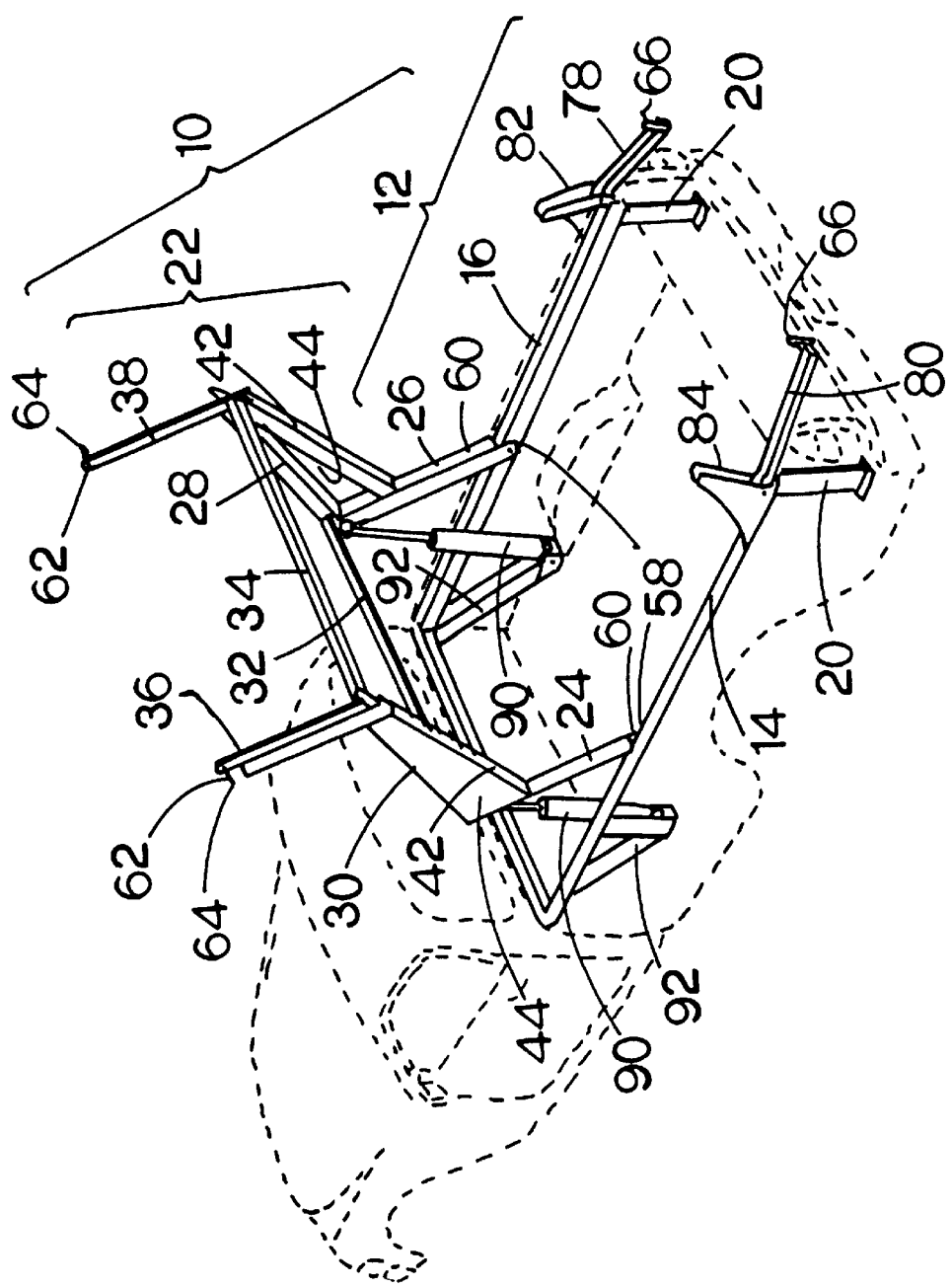
FIG. 5 shows a pivoting frame for the preferred embodiment of the dump rack in an upper position attached to the stationary frame shown in FIG. 3 and rear pivoting legs pivotally attached to the rear pivot pin support brackets.

A pivoting frame 22 is pivotally attached to the stationary frame 12. FIGS. 4 and 5. The pivoting frame 22 has several important functions, so the configuration and arrangement plays an important part in this invention. These will be explained as the various components are described. The pivoting frame 22 is the portion of the dumping rack 10 that allows the rack to dump its load, provides clearances and provides leverage. It pivots between a lower position, shown in FIG. 4, to an upper position, shown in FIG. 5. In the preferred embodiment, the pivoting frame 22 has four sections or types of members, ie. base members 24 and 26, upright supports 28 and 30, lateral cross members 32 and 34, and forward projection members 36 and 38. However, this is a typical configuration. Other similar configurations and other members performing the same function and are generally equivalent in nature, could also function as the pivoting frame 22.

In the preferred embodiment, the pivoting frame 22 has a pair of base members 24 and 26 that forms the base or lower section of the pivoting frame 22. The rearward end of the base members 24 and 26 are pivotally attached to the side members 14 and 16 at pivot points 58. The specific length of the base members is important, in that the length determines the location of the pivot points 58 on the side members 14 and 16, and partially determines leverage, lifting height, and clearances, which are later explained.

Typically, in the preferred embodiment, the base members 24 and 26 are made from angle iron. Using angle iron, as the preferred embodiment, the base members 24 and 26 are configured such that the inside surface of one leg of the angle iron rests upon the top surface of the side members 12 and 14. The other leg of the angle iron extends downward on the inside of the side members. In another words, the downward extending leg is on the inside of the stationary frame 12. This provides sideways stability to prevent the pivoting frame 22 from twisting or turning on the stationary frame 12.

The base members 24 and 26 are pivotally attached to the side members 14 and 16 with a pivot pin 60. A bore with or without a bushing would be on the rearward end the base members 24 and 26. The bore would be located on the downward leg of the angle iron in the preferred embodiment. The bore would be for receiving a forward pivot pin 60 that pivotally attaches the base members 24 and 26 to the side members 14 and 16.

Upright support members 28 and 30 are perpendicularly attached to forward ends of the base members 24 and 26. The height of these members provide vertical clearances and overall height of the dump rack 10 above the stationary frame 12. Typically, in the preferred embodiment, the upright support members 28 and 30 are made from square or rectangular steel tubing. However, they could also be made with other materials having the strength necessary for the application. In a typical application on a pickup truck 8, as shown, the height will be slightly greater than the height of the vehicle's cab above the sides of the bed.

Lateral cross members 32 and 34 are typically attached at an upper end and at lower ends, and between and to the upright supports 28 and 30. These add stability and strength, and overall structure integrity. Again, these are made from square or rectangular steel tubing in the preferred embodiment, but could be made from other materials having the necessary strength for the application. The tubing provides strength as well as providing an aesthetical appearance.

A protective panel or screen 48 may be added onto the lateral cross members 32 and 34 and up right supports 28 and 30. The protective screen 48 protects the window, or other surface, on the vehicle. The protective screen 48 also provides strength and integrity to the pivoting frame 22. It helps prevent twisting and torquing within the pivot frame 22.

Forward projection members 36 and 38 are attached to and extend forward from an upper end of the upright supports 28 and 30. A rearward end of the forward projection members 36 and 38 are rigidly attached to an upper end of the upright support members 28 and 30. The forward end has pivot points 62 for attachment of the dump rack 70. Typically, and in the preferred embodiment, the forward projection members are made from angle iron. Angle iron provides the benefit of forming a frame for receiving a dump frame 70 to fit within. This feature prevents sideways motion or movement of the dump frame 70 when in the lower position and resting on the pivoting frame 22.

Generally, the longer the length of the base members 24 and 26, the less lifting force is required to pivot the pivoting frame 22. Also the total combined length of the base members and the forward projecting members plus the lift height of the lifting mechanism determines the total height of the forward end of the dump frame when in the upper position. The lengths of the forward projection members, base members and the available lifting force and lift height of the lifting mechanism have to optimized for best performance.

The length of the forward projection members 36 and 38 is critical, in that the length determines the overall lift height of the forward end of the dump frame 70 when in an upper position, plus determining leverage and lifting forces for the dump rack 70. The longer the forward projection members the higher the forward end of the dump frame 70 will be lifted and the greater the lifting force required to lift the pivoting frame and dump frame 70.

As such, every application or purpose may be somewhat different than the other, depending on the vehicle, expected load capacity, clearances required, desired lifting height for dumping the load, and similar other factors.

Additional support members, such as support members 42, and finishing panels 44 may also be added as needed or as desired. The support members 42 add additional strength and integrity of the pivoting frame 22, especially for support and stability of the forward projection members 36 and 38. These may be needed in some or most applications, especially when heavy loads are anticipated. Finishing panels 44 may be provided on the outside of the upright support members and additional support members. These provide additional strength and integrity, but the primary purpose is to provide a finished and aesthetical appearance.

A dump frame 70 is the uppermost section or frame on the dump rack 10 of this invention. The dump frame 70 generally consists of a frame having lateral side members 72 and 74, and a plurality of cross members 76. There will always be at least a forward cross member and a rear cross member 76. Only one intermediate cross member is shown, but there can be any number as needed by the particular application or intended use. Typically, all intermediate cross members 76 will be rigidly attached between the lateral side members.

The rear cross member 76 could also be rigged or arranged such that it is removable. This would allow greater access into the box of the truck. There are several different methods to provide this function. Brackets, bolts, cutouts, pins, other items and/or combination of items may be used to make the rear cross member removable. Any and all methods to make it removable are considered within the scope of this invention. The making of a removable cross member is not the invention, but rather just an option that's available. An illustration is not needed to understand this concept. It will be readily understood by anyone skilled in the art.

A platform or plate can be attached to the upper side of the cross members and inside edges of the lateral side members. This is another option that's available. The platform provides an upper bed and a continuous surface for transporting material. Again, an illustration is not needed for the understanding of this concept.

Generally speaking, the lateral cross members 76 are attached to the lateral side members 72 and 74 in a manner that allows an exposed upright edge along the lateral side members. This provides a stop or "box" to prevent the load from rolling or sliding off the sides.

The dump frame 70 is pivotally attached to a forward end of the forward projection members 36 and 38 at point 62. Pivot pins 64, generally extend from the forward projection members for receiving and attaching a forward portion of the dump frame 70. The lateral side members 72 and 74 typically have a bore, with or without a bushing, for receiving the pivot pin 64. The bore for receiving the pivot pins 64 are located on a forward portion, but not necessarily at the end, of the lateral side members 72 and 74. The greater the length of the dump frame 70 and the lateral side members 72 and 74, beyond the bores, the higher the forward end will be lifted in the upper position. Again, the length combined with the length of the base members 24 and 26, forward projection members 36 and 38, and along with the lifting height and force of the lifting means 90 have to be optimized for the particular application. One length may or may not be ideal for any particular application.

The rear of the dump frame 70 is pivotally attached to the stationary frame 12 by a pair of rear pivot legs 78 and 80. The rear pivot legs 78 and 80 are generally made from steel tubing, but could also be made with other suitable material. The steel tubing provides strength and rigidity, as well as a finished appearance. The rear pivot legs 78 and 80 are generally the same height as the upright supports 28 and 30 so that the dump frame 70 will be held at a parallel position above the vehicle bed or pickup truck 8 box, when the dump frame 70 is in the lower position.

The rear pivot legs 78 and 80 are pivotally attached to the rear of the side members 14 and 16 by pivot pin support brackets 82 and 84, which are rigidly attached to the rearward end of side members 14 and 16. The pivot pin support brackets 82 and 84 are structurally very sound, in that the rear pivot legs 78 and 80 attached therein generally support a majority of the load, as well as providing for pivotally attaching the rear pivotal legs 78 and 80. As such, in the preferred embodiment, the pivot pin support brackets 82 and 84 are made into a channel 86 from steel plating, channel steel, or other strong materials with a lower end of welded, or otherwise rigidly attached, to the side members 14 and 16. The open face of the channel 86 faces the rear of the vehicle 8 and rear of the dump rack 10. Additional support plates 88 may be added for strength and rigidity, as well as for appearance.

A pivot pin 68 extends through the pivot pin support brackets and channel at a lower position for pivotally attaching the rear pivot legs 78 and 80. This arrangement allows the rear pivot legs 78 and 80 to rest within the channel when in an upright position with the dump frame 70 and pivoting frame 22 in the downward position. This prevents any sideways motion or movement of the rear end of the dump frame 70 and prevents any twisting or motion of the rear pivot legs 78 and 80. It holds the rear pivot legs 78 and 80, and therefore the dump frame 70, in a very secure position. The rear pivot legs 78 and 80 pivot rearward out of the channel 86 when the dump frame is raised to dump its load.

The top of the rear pivot legs 78 and 80 are pivotally attached to the dump frame 70 by pivot pins 66 extending through a bracket on top of the pivot legs 78 and 80 and through a rearward location on the lateral side members 72 and 74.

As the pivot frame 70 is lifted by the lifting means 90, the forward end of the dump frame 70 is raised. The arrangement of the rear pivot legs 78 and 80 pivots the rear end of the dump frame 70 outward and downward. This allows clearance for the tail gate and the rear of the vehicle and lowers the end of the dump frame 70 to lower the dumping height of the load. This is important, because it lowers the rear of the dump frame 70 but yet vehicle clearance is provided. If the rear legs were rigid and the front of the dump frame were raised, there would be no or little clearance as the load comes off the rack and the dumping height for the load would be greater. Therefore, this arrangement as described is an important consideration in determining the overall effectiveness of the dump rack 10 of this invention.

The dump rack 10 of this invention has a plurality of pivot points. The arrangement and location of these pivot points are important in that they provide the capacity to dump heavy loads, provides leverage, provides a high lifting height without using a large or long lifting mechanism, provides clearance at the rear of the vehicle to clear such things as a tail gate or tail lift, provides overhead clearance, and provides stability to the entire rack.

The rear end 28 and 30 of the base members 24 and 26 are pivotally attached to forward pivot points 32 and 34 at a mid point of the side members 14 and 16. The pivot points 32 and 34 will contain a pivot pin 60 attached to the downward leg of the angle iron of the side members 12 and 14 at a mid point between the forward and rear ends. These forward pivot pins 60 are common and details and illustrations are not required for an understanding of this feature. The exact mid point location is determined based upon the amount of leverage and lifting height desired or needed depending on the application.

A lifting means 90 is provided to pivot the pivoting frame 22 between a lower position, FIG. 4, and an upper position, FIG. 5. In the preferred embodiment, the lifting means 90 is a pair of hydraulic cylinders, also indicated by the reference numeral 90. A pair of cylinders is preferred because it provides greater lift capacity with smaller cylinders, provides more stability during lifting, and allows more clearance and storage capacity in the box of the vehicle. In this preferred embodiment, the hydraulic cylinders 90 are mounted within the box, one on each side near the front outer corners of the box. One end of the hydraulic cylinder 90 is pivotally attached to an inside lower surface of the pivoting frame 22. The other end is pivotally attached to a bracket located in the bed or box of the truck. In the preferred embodiment, a lift means frame 92 is provided for attachment of the lower end of the lifting means 90. The lifting means frame 92 is made from steel angle iron in the preferred embodiment. The lifting means frame 92, in the preferred embodiment, is rigidly attached to the stationary frame 12. Generally it consists of an angle iron section extending at an angle from the inside forward corners of the stationary frame to the bottom, or lower section, of support legs 20.

There are several advantages in doing this. First, as the lifting means 90 provides lift, forces are directed entirely within the stationary frame 12 and lifting means frame 92. It eliminates most if not all forces from being directed to the vehicle. Secondly, it allows the entire dump rack 10 to be easily removed or installed as a complete single unit, rather than as a series of individual units assembled and installed on the truck or vehicle. Thirdly, it provides structural integrity and adds overall strength to the entire stationary frame 12.

Other types of lifting means could also be utilized if desired and acceptable for the application. Electric lifting apparatuses could be used as well as pneumatic cylinders. Any number of possible lifting mechanism could be used without departing from the scope and spirit of this invention. The hydraulic cylinders are preferred because they are readily available and are widely used and generally provide the greatest lifting strength for the size. Controls for the hydraulic can be mounted with the cab of the vehicle, can be attached to a long electric cable, or with some sort of remote control.

Typically, the operator or worker unloading the dump rack 10 would not have to be within reach of the load as it is dumped. He could be in the cab, or at a safe location within sight of the load being unloaded. The operator, using the controls for the lifting means 22 can also generally control the rate at which a load is dumped. He can raise the front of the dump frame a little or a lot, depending on the desired rate of unload. In some instances, as the load is being dumped the load will partially stay on the dump frame 70. In this instance the operator simply drives the vehicle forward until the load completely clears the dump rack 10.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the claims and their equivalents.

What is claimed is:

1. A dump rack comprising:
 a stationary frame attachable to a vehicle, said stationary frame having a pair of side members, and a forward cross member attached to forward ends of said side members, said stationary frame stabilizing and securing said dump rack to said vehicle;
 a forward pivot point at a mid point on each of said side members;

a pivoting frame, said pivoting frame comprising a pair of base members, a rear end of said base members pivotally attached to said forward pivot points on said side members; upright support members perpendicularly attached to forward ends of said base members, lateral cross members between and attached to said upright support members; and forward projection members extending forward from an upper end of said upright support members; said pivoting frame pivoting between a lower position and an upper position;

a top forward pivot point at the forward end of each of said forward projection members;

a lifting mechanism, said lifting mechanism pivoting said pivoting frame between said lower position and said upper position;

a dump frame, said dump frame comprising a frame having lateral side members and cross members, said dump frame pivotally attached to said top forward pivot points on said forward projection members at a point on said side members rearward from a forward end of said dump frame; and a pair of rear pivot legs, each of said pivot legs extending between rear pivot points at a rear location on said side members of said stationary frame to a rear position on said lateral side members on said dump frame.

2. The dump rack as set forth in claim 1 further comprising a protective panel, said protective panel attached to said lateral cross members and said upright supports members on said pivoting frame.

3. The dump rack as set forth in claim 1 further comprising an additional support extending between said base members and said forward projection members on said pivoting frame to provide additional strength and integrity.

4. The dump rack as set forth in claim 1 further comprising a finish panel on sides of said pivoting frame to improve aesthetical appearance and add strength for said upright support members.

5. The dump rack as set forth in claim 1 in which said lifting mechanism comprises one or more hydraulic cylinders.

6. The dump rack as set forth in claim 1 further comprising a lifting means frame, said lifting means frame extending from said side members on said stationary frame to receive one end of said lifting mechanism, with a second end of said lifting mechanism attached to said pivoting frame, said lifting means frame directing forces from said lifting mechanism to said stationary frame.

7. The dump rack as set forth in claim 1 further comprising a removable rear cross member on said dump frame.

8. The dump rack as set forth in claim 1 further comprising a platform attached to an upper portion of said dump frame between said lateral side members.

9. The dump rack as set forth in claim 1 further comprising support legs extending downward from said side members on said stationary frame to a floor or bed of said vehicle.

10. The dump rack as set forth in claim 1 further comprising additional support members, said additional support members being brackets added between a frame on said vehicle and to an underside of a floor or bed on said vehicle; and attached to a lower end of support legs extending down from said stationary frame to a topside of said vehicle's floor or bed.

11. A dump rack comprising:

a stationary frame attachable to a vehicle, said stationary frame having a pair of side members, and a forward cross member attached to forward ends of said side members, said stationary frame stabilizing and securing said dump rack to said vehicle;

support legs extending downward from said side members on said stationary frame to a floor or bed of said vehicle;

a pivoting frame, said pivoting frame comprising a pair of base members, a rear end of each of said base members pivotally attached to pivot points at a mid point on said side members; upright support members perpendicularly attached to forward ends of said base members, one or more lateral cross members extend between and are attached to said upright support members; forward projection members extend forward from an upper end of each of said upright support members; said pivoting frame pivotal between a lower position and an upper position;

a lifting mechanism, said lifting mechanism pivoting said pivoting frame between said lower position and said upper position;

a lifting means frame, said lifting means frame extending from said side members on said stationary frame to receive one end of said lifting mechanism, with a second end of said lifting mechanism attached to said pivoting frame, said lifting means frame directing forces from said lifting mechanism to said stationary frame;

a pair of rear pivot legs, each of said rear pivot legs pivotally attached to a rear position on said stationary frame; and a dump frame, said dump frame comprising a frame having lateral side members and one or more cross members, said dump frame pivotally attached to a forward pivot point at a forward end on each of said forward projection members at a point on said side members on said dump frame rearward from a forward end of said dump frame; and pivotally attached to a top end of said rear pivot legs.

12. The dump rack as set forth in claim 11 further comprising a protective panel, said protective panel attached to said one or more lateral cross members and said upright support members on said pivoting frame.

13. The dump rack as set forth in claim 11 further comprising an additional support extending between said base members and said forward projection members on said pivoting frame to provide additional strength and integrity.

14. The dump rack as set forth in claim 11 further comprising a finish panel on sides of said pivoting frame to improve aesthetics and to add strength for said upright support members.

15. The dump rack as set forth in claim 11 in which said lifting mechanism comprises one or more hydraulic cylinders.

16. The dump rack as set forth in claim 11 further comprising a removable rear cross member on said dump frame.

17. The dump rack as set forth in claim 11 further comprising a platform attached to an upper portion of said dump frame between said lateral side members.

18. The dump rack as set forth in claim 1 further comprising additional support members, said additional support members being brackets added between a frame on said vehicle and to an underside of a floor or bed on said vehicle; and attached to a lower end of support legs extending down from said stationary frame to a topside of said vehicle's floor or bed.

19. A dump rack comprising:

a stationary frame attachable to a vehicle;

a pivoting frame pivotally attached to said stationary frame, said pivoting frame extending forward and pivoting from a mid point along side members on said stationary frame, said pivoting frame having upright supports extending upward from a forward end of said pivoting frame, and forward projecting members extending forward from a top end of said upright supports;

a lifting mechanism to pivot said pivoting frame between a lower position and an upper position;

rear pivot pin support brackets at a rear location on said side members of said stationary frame;

rear pivot legs pivotally attached to said rear pivot pin support brackets; and a dump frame pivotally attached to forward ends of said forward projecting members on said pivoting frame and to top ends of said rear pivot legs.

* * * * *